United States Patent
Watabe

(10) Patent No.: US 7,075,419 B2
(45) Date of Patent: Jul. 11, 2006

(54) TIRE PNEUMATIC PRESSURE MONITORING SYSTEM

(75) Inventor: Nobuya Watabe, Nagoya (JP)

(73) Assignee: Denso Corporation, Kariya (JP)

( * ) Notice: Subject to any disclaimer, the term of this patent is extended or adjusted under 35 U.S.C. 154(b) by 126 days.

(21) Appl. No.: 10/811,800

(22) Filed: Mar. 30, 2004

(65) Prior Publication Data

US 2004/0189457 A1    Sep. 30, 2004

(30) Foreign Application Priority Data

Mar. 31, 2003  (JP) ............................... 2003-094865

(51) Int. Cl.
*B60C 23/00*  (2006.01)

(52) U.S. Cl. ............. 340/447; 340/442; 340/443; 340/449; 73/146; 73/146.2

(58) Field of Classification Search ........ 340/442–449, 340/439.1, 426.33; 73/146, 146.2; 116/34 R
See application file for complete search history.

(56) References Cited

U.S. PATENT DOCUMENTS

| | | | |
|---|---|---|---|
| 5,559,484 A | * | 9/1996 | Nowicki et al. ............ 340/447 |
| 5,602,524 A | | 2/1997 | Mock et al. |
| 5,880,363 A | * | 3/1999 | Meyer et al. .............. 73/146.5 |
| 6,062,072 A | | 5/2000 | Mock et al. |
| 6,518,877 B1 | * | 2/2003 | Starkey et al. ............. 340/447 |
| 6,545,599 B1 | | 4/2003 | Derbyshire et al. |
| 6,581,449 B1 | * | 6/2003 | Brown et al. ................. 73/146 |
| 6,882,270 B1 | | 4/2005 | Stewart et al. |
| 2002/0047779 A1 | | 4/2002 | Arita |
| 2004/0183665 A1 | | 9/2004 | McClelland et al. |

FOREIGN PATENT DOCUMENTS

EP    WO 01/19626 A1    3/2001

* cited by examiner

Primary Examiner—Daniel Wu
Assistant Examiner—Edny Labbees
(74) Attorney, Agent, or Firm—Posz Law Group, PLC

(57) ABSTRACT

Tires of wheels of a vehicle incorporate detectors that detect the pneumatic pressures and transmit them wirelessly to a plurality of receivers installed on the vehicle. A monitoring device monitors the pneumatic pressures in the tires based on the tire data obtained by the receivers. The receivers and the monitoring devices are connected together through a single communication line, and the monitoring device obtains tire data from the receivers by polling. For each receiver, a receiver ID necessary for the communication with the monitoring device of the vehicle-side is set through a connector that connects the single communication line and the power source line to the receiver.

19 Claims, 4 Drawing Sheets

TIRE PNEUMATIC PRESSURE MONITORING SYSTEM

CROSS REFERENCE TO RELATED APPLICATION

This application is based on and incorporates herein by reference Japanese Patent Application No. 2003-94865 filed Mar. 31, 2003.

FIELD OF THE INVENTION

This invention relates to a tire pneumatic pressure monitoring system for a plurality of tires of a vehicle by receiving, through receivers installed on a vehicle, electromagnetic wave signals transmitted from detectors incorporated in the tires.

BACKGROUND OF THE INVENTION

A monitoring system for monitoring the pneumatic pressures in pneumatic tires, such as disclosed in US 2002/0047779A1 (JP-A-2002-67638), incorporates in tires of a vehicle detectors which include a pneumatic pressure sensor and a signal transmission circuit for wirelessly transmitting the result detected by the pneumatic pressure sensor. The monitoring system receives electromagnetic wave signals transmitted from the detectors through receivers mounted on the vehicle, so that a monitoring device monitors the pneumatic pressures in the tires based on the receive signal.

In this monitoring system, the receivers that form pairs with the detectors in the tires are mounted near the tires, and the receive data (pneumatic pressure data, etc.) which the receivers have obtained from the detectors are transmitted to the monitoring device.

In this monitoring system, if the receive data are directly transmitted to the monitoring device at a moment when the receiver has received electromagnetic wave signals transmitted from the detectors of other vehicles or from the detectors of other tires that are not corresponding to the receiver, then, the monitoring device may erroneously determine a decrease in the pneumatic pressure.

Therefore, it is proposed in U.S. Pat. No. 5,602,524 (JP-7-507513) that a monitoring system imparts an identification data specific to a tire to a transmission signal at the time when a detector transmits a detected result. Thus, a receiver determines, based on the identification data, whether the receive data be transmitted to a monitoring device.

In the above conventional monitoring systems, however, the receivers are connected to the monitoring device through dedicated signal lines, and only a predetermined number of receivers are connected to the monitoring device. Therefore, different systems must be built up for each of the vehicles on which the receivers of different numbers are installed. Namely, the receivers and the monitoring devices cannot be commonly used for the vehicles of different kinds.

In the case of large vehicles such as trucks and buses, the number of tires and the arrangement thereof are different depending upon the kind of the vehicles. To build up a monitoring system for monitoring the pneumatic pressures in the tires of large vehicles, therefore, the monitoring system must be built up for each of the types of the vehicles by using the receivers and the monitoring devices that meet the kind of the vehicles. Therefore, it is not possible to use the receivers and the monitoring devices in common for the vehicles of different kinds.

In order to solve the above problem, another monitoring system can be contrived in which a plurality of receivers necessary for building the monitoring system are connected to the monitoring device through a communication line permitting the monitoring device to obtain receive signals from the receivers through the single communication line, the detectors incorporated in the tires transmit identification data specific to the tires in addition to the detected results of pneumatic pressures as in U.S. Pat. No. 5,602,524, and the receivers transmit to the monitoring device through the single communication line the signals received from the detectors.

Namely, the monitoring device obtains receive signals from a plurality of receivers through a single communication line, and monitors the pneumatic pressures in the tires based upon the identification data of the tires included in the receive data. Thus, it is possible to monitor the pneumatic pressures in all tires of the vehicle despite of a change in the number of the receivers.

In order for the monitoring device to obtain receive data from the plurality of receivers through a single communication line, however, the receivers must transmit the receive data in response to an instruction from the monitoring device. For this purpose, identification data for communication must be imparted to the receivers, and the monitoring device must send instructions to the receivers based on the identification data.

In this case, identification data must be set for each of the receivers that are installed. Besides, the identification data that are set must be registered to the monitoring device. After all, among the vehicles of different types, it is not possible to build a monitoring system for monitoring pneumatic pressures in vehicle tires by using the same receivers or the monitoring device.

SUMMARY OF THE INVENTION

This invention has an object of providing a monitoring system for monitoring pneumatic pressures in tires for vehicles having different number of tires and different arrangement of tires, by using the same parts, that is, receivers, monitoring device, etc., that form the monitoring system without changing the specifications or operating conditions of the parts.

According to a monitoring system for monitoring pneumatic pressures in tires, a plurality of detector devices incorporated in a plurality of tires of a vehicle detect the pneumatic pressures in the tires, tire data obtained by imparting the tire identification data to the detected results are transmitted wirelessly, and a plurality of receiver devices receive the transmitted electromagnetic wave signals thereby to obtain tire data from the tires.

The receiver devices are connected to the monitoring device through a single communication line. The monitoring device communicates with the receiver devices through the single communication line to obtain tire data of the tires received by the receiver devices, monitors the pneumatic pressures in the tires based on the obtained tire data, and informs the driver of the monitored results.

In order for the monitoring device to communicate with the plurality of receiver devices through the single communication line, identification data for communication must be imparted to the receiver devices. In installing the receiver devices on the vehicle, identification data for communication are imparted to the receiver devices from the vehicle-side through identification data imparting devices provided at the positions of installation thereof.

Therefore, places for installing the receiver devices are determined for each of the vehicles which may have different numbers of tires and different arrangements of tires, and the identification data imparting devices are provided at the places of installation to thereby form a monitoring system for monitoring the pneumatic pressures in the tires by using the receiver devices having the same specifications and the same operating conditions.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1A:
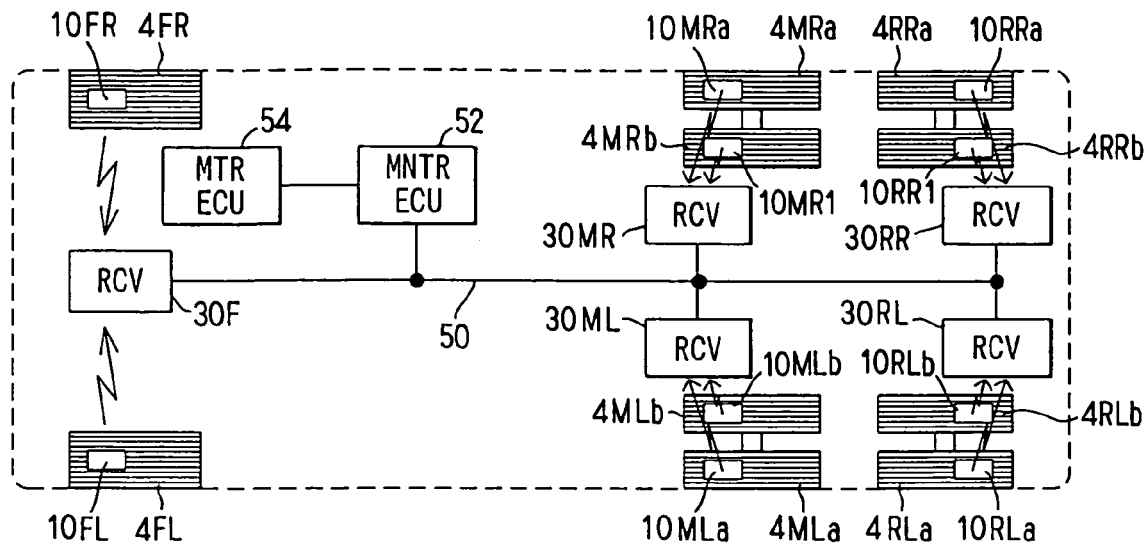
FIGS. 1A to 1C are a block diagram and views illustrating a tire pneumatic pressure monitoring system according to an embodiment of the present invention.

Referring to FIG. 1A, a vehicle is provided with a total of ten tires 4 which include a pair of right and left front wheel tires 4FL and 4FR provided at the front of the vehicle, two pairs of right and left rear wheel tires 4RLa, 4RLb, 4RRa and 4RRb provided at the rear of the vehicle, and two pairs of right and left central wheel tires 4MLa, 4MLb, 4MRa and 4MRb arranged near the center side of the vehicle in front of the rear wheel tires. Subscript "a" attached to the reference signs of the rear wheel tires and center wheel tires represents tires arranged on the right and left outer sides of the vehicle, and subscript "b" represents tires arranged on the insides of these tires.

These ten tires 4 are provided with respective detectors 10 (10FL, 10FR, 10RLa, 10RLb, 10RRa, 10RRb, 10MLa, 10MLb, 10MRa and 10MRb) which detect the pneumatic pressures in the tires 4 and transmit the detected results wirelessly.

Figure 1B:
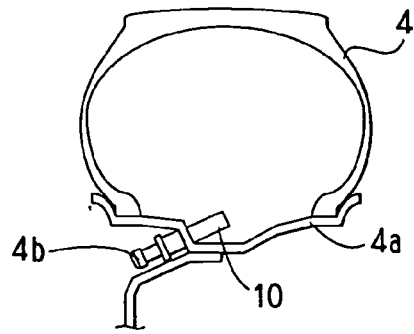

The detector 10 of each tire 4 is constructed, as illustrated in FIG. 1B, integrally with a valve portion 4b for injecting the air into the tire 4, and is secured to the rim 4a of the tire 4.

The vehicle is further provided with a total of five signal receivers 30 including a receiver 30F installed nearly at an intermediate position between the front wheel tires 4FL and 4FR, a receiver 30RL installed near the left rear wheel tires RLa, RLb, a receiver 30RR installed near the right rear wheel tires RRa, RRb, a receiver 30 ML installed near the left center wheel tires 4MLa, 4MLb, and a receiver 30MR installed near the right center wheel tires 4MRa, 4MRb.

These five receivers 30 are connected to each other through a communication line (single wire) 50, and are connected to a monitoring ECU 52 for monitoring the pneumatic pressures in the tires thereby to execute LIN communication (local interconnect network communication) relative to the monitoring ECU 52.

Figure 1C:
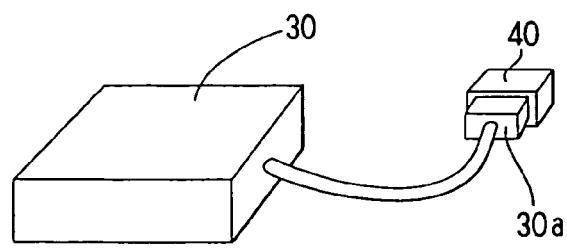

At the positions where the receivers 30 are installed on the vehicle, vehicle-side connectors 40 are provided as shown in FIG. 1C to connect the single communication line 50 and the power source line (not shown) of the vehicle to the receivers 30. At the time of installing the receivers 30 on the vehicle, the receiver-side connectors 30a are fitted to the vehicle-side connectors 40 so as to be commonly connected to the single communication line 50 and to the power source line of the vehicle.

A meter ECU 54 is connected to the monitoring ECU 52. When any abnormal tire is detected from the pneumatic pressure data obtained through the receivers 30, the meter ECU 54 receives information of this fact and works to flash a pneumatic pressure alarm light installed in front of the driver's seat in the vehicle.

The meter ECU 54 is for controlling the indicators such as a speedometer, etc., as well as display panels for displaying various data and alarm lights installed in front of the driver's seat. The monitoring ECU 52 is for informing the driver of the abnormal pneumatic pressures in the tires and the like through the meter ECU 54.

Figure 2:
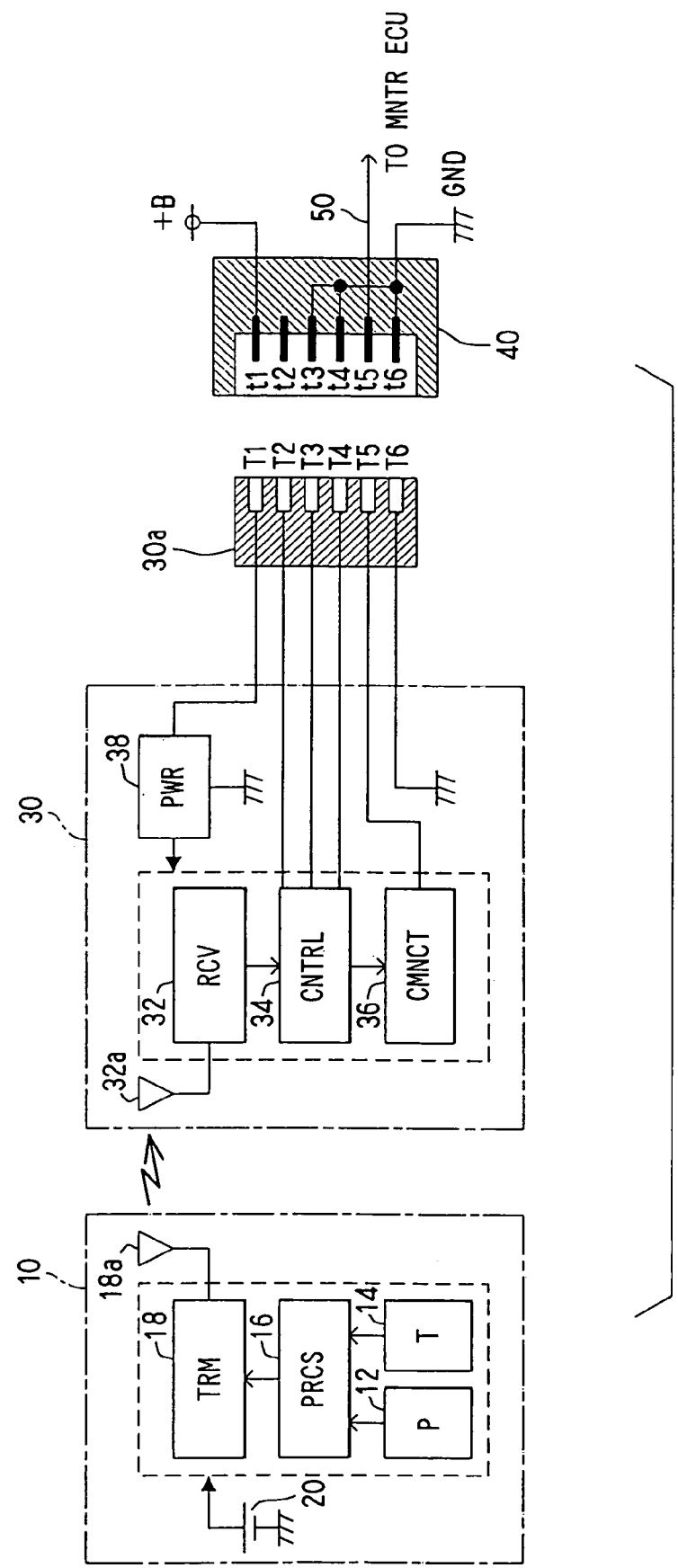
FIG. 2 is a circuit diagram illustrating a detector, a receiver, a connector of the receiver-side and a connector of the vehicle-side in the embodiment.

Each detector 10, receiver 30, connector 30a of the receiver-side and connector 40 of the vehicle-side are illustrated in detail in FIG. 2.

The detector 10 attached to the tire 4 is formed with a pressure sensor 12 for detecting the pneumatic pressure P in the tire 4, a temperature sensor 14 for detecting the temperature T in the tire 4, a processing circuit 16 that receives, as numerical values, detection signals of the pneumatic pressure and temperature from the sensors 12 and 14, and produces tire data by adding a preset tire identification data (tire ID) to the detected data (pneumatic pressure data and temperature data) that are received, a signal transmission circuit 18 that forms a transmission signal by modulating carrier waves of a predetermined frequency in compliance with the tire data output from the processing circuit 16 and transmits the thus formed transmission signal wirelessly as a radio signal or electromagnetic wave signal from a transmission antenna 18a, and a battery cell 20 for supplying electric power to the above sensors and circuits. The processing circuit 16 operates at a predetermined transmission interval to periodically transmit tire data through the transmission circuit 18.

The receiver 30 is formed with a receiving circuit 32 which receives the electromagnetic wave signals transmitted from the detector 10 through a receiving antenna 32a, and demodulates the tire data from the receive signals transmitted from the detector 10, a communication circuit 36 for executing the communication relative to the monitoring ECU 52 through a communication line 50, a control circuit 34 and a power source circuit 38.

The control circuit 34 causes the communication circuit 36 to transmit the tire data to the monitoring ECU 52 by sending the tire data received by the receiving circuit 32 to the communication circuit 36 when the receiving circuit 32 receives the demodulated tire data and when the communication circuit 36 receives a request signal which is transmitted to the receiver 30 from the monitoring ECU 52. The power source circuit 38 forms a constant DC voltage (power source voltage) for operating the above circuits from a battery voltage +B of the vehicle supplied through a power source line, and feeds the constant DC voltage to the above portions.

The control circuit 34 is formed with a microcomputer. A request signal which the monitoring ECU 52 sends to the single communication line 50 includes an identification data for communication (receiver ID) set for each of the receivers 30. When the communication circuit 36 receives the request signal, the control circuit 34 determines whether the receiver ID in the request signal is in agreement with a receiver ID that has been set in advance and stored in the receiver 30. When the receiver IDs are in agreement, it is so determined that the monitoring ECU 52 is requesting the tire data, and the tire data received through the receiving circuit 32 is sent onto the single communication line 50 through the communication circuit 36.

The connector 40 of the vehicle-side incorporates a total of six terminals t1 to t6 including a terminal t1 connected to the power source line of the vehicle, terminals t2, t3 and t4 for imparting a specific receiver ID varying from receiver to receiver 30, a terminal t5 connected to the single communication line 50, and a terminal t6 connected to the ground line (usually chassis) of the vehicle. The connector 30a of the receiver-side, too, has six terminals T1 to T6 corresponding to the vehicle-side terminals t1 to t6.

The terminal T1 of the connector 30a of the receiver-side is connected to the power source circuit 38 to supply the battery voltage +B of the vehicle fed through the power source line, the terminals T2 to T4 are connected to the control circuit 34 for imparting the receiver ID to the corresponding receiver 30, the terminal T5 is connected to the communication circuit 36 for connecting the single communication line 50 to the communication circuit 36, and the terminal T6 is grounded to the ground line of the receiver 30 to bring the ground potential of the receiver 30 into agreement with that of the vehicle-side.

The control circuit 34 imparts the data of 3 bits as a receiver ID by grounding or opening the ports to which the terminals T2 to T4 are connected. The terminals t2 to t4 of the connector 40 of the vehicle-side are connected to the grounding terminal t6 or are opened depending upon a predetermined receiver ID.

Namely, in this embodiment, the terminals t2 to t4 of the connector 40 of the vehicle-side work as identification data imparting device. Therefore, to each receiver 30 is automatically imparted a specific receiver ID from the connector 40 of the vehicle-side when the receivers 30 are installed on the vehicle and when the connectors 30a of the receiver-side are fitted to the connectors 40 of the vehicle-side.

The monitoring ECU 52 is also formed by a microcomputer, and executes processing for monitoring the tire conditions in accordance with a preset program by receiving tire data of the tires 4 from the receivers 30. Here, the tire data are obtained from the receivers 30 based on polling operation by successively transmitting request signals including receiver IDs for each of the receivers 30, so that the tire data are transmitted from the receivers 30.

In order for the monitoring ECU 52 to execute the polling operation, the receiver IDs for the receivers 30 must be registered to the monitoring ECU 52. In this embodiment, the monitoring ECU 52 is so designed as to execute the processing for obtaining vehicle data only once when it is mounted on the vehicle and immediately the power source circuit is closed for the first time. Due to the processing for obtaining the vehicle data, the vehicle data such as receiver IDs necessary for the polling operation are automatically registered to the monitoring ECU 52.

Figure 3:
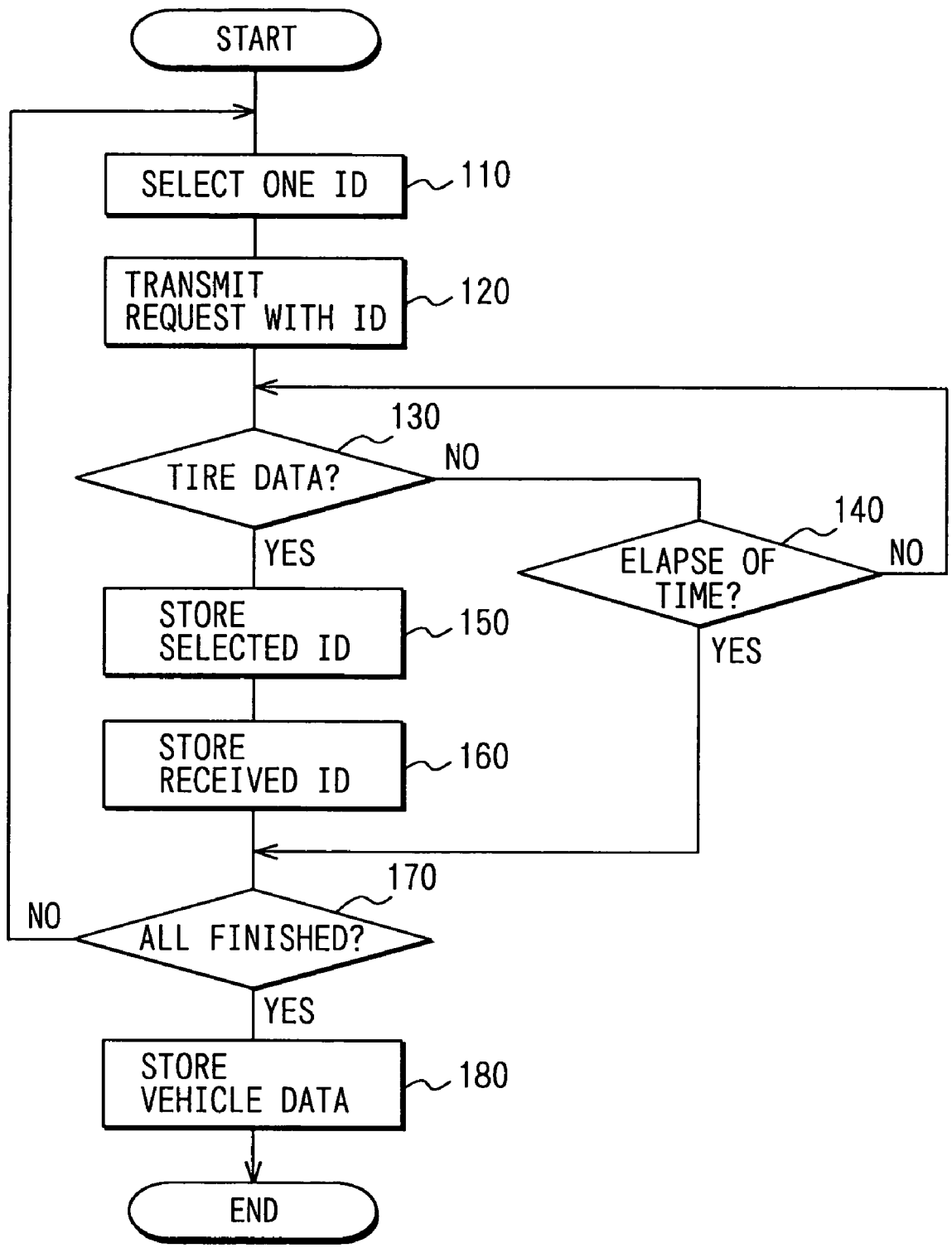
FIG. 3 is a flowchart illustrating processing for obtaining vehicle data executed by a monitoring ECU in the embodiment.
Figure 4:
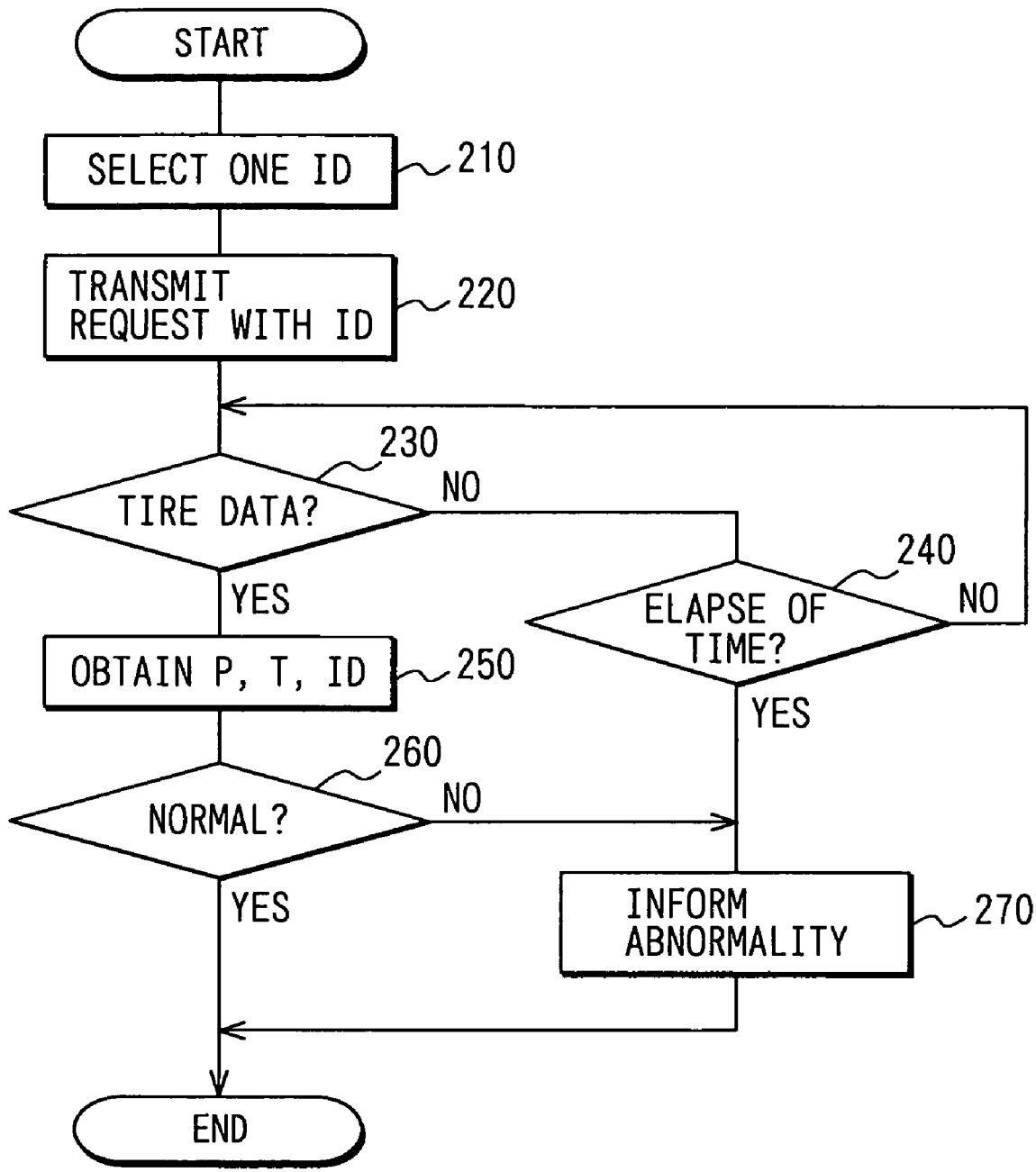
FIG. 4 is a flowchart illustrating processing for monitoring the tire conditions executed by the monitoring ECU in the embodiment.

The processing for obtaining the vehicle data and the processing for monitoring the tire data executed by the monitoring ECU 52 are illustrated in FIGS. 3 and 4.

First, FIG. 3 is a flowchart illustrating the processing for obtaining vehicle data. This processing is executed only when the ignition switch is turned on. To execute this processing, a memory (ROM) of the monitoring ECU 52 stores all of the predetermined receiver IDs so as to be used in the vehicle which mounts the monitoring ECU 52. Once the vehicle data is stored in a memory (EEPROM) by this processing of FIG. 3, this processing need not be repeated each time the ignition switch is turned on.

In the processing for obtaining the vehicle data as illustrated in FIG. 3, first, only one receiver ID is selected and read out of many receiver IDs stored in the ROM at S110 (S represents step). Then, a request signal including the receiver ID is output onto the single communication line 50 at S120 for transmission to the receiver 30.

At subsequent S130, it is determined whether the tire data is received through the single communication line 50. If the tire data is not received, it is determined at S140 whether a preset period of time that has been set in advance for obtaining the tire data has elapsed. If the preset period of time has not been elapsed, the routine returns to S130 to wait for the transmission of tire data from any receiver 30 for the preset period of time.

When it is determined at S140 that the preset period of time has elapsed, it is so determined that there is no receiver 30 that transmits the tire data in response to the request signal produced at S120, that is, there is no receiver 30 to which is imparted the receiver ID read at S110, and the routine proceeds to S170.

When it is determined at S130 that the tire data is received, the routine proceeds to S150 since the tire data is the one from the receiver 30 to which is imparted the receiver ID that is selected at S110 and transmitted this time being included in the request signal. Therefore, the receiver ID is then stored in the memory (such as backup RAM backed up by a battery or EEPROM, etc.) as a receiver ID for monitoring the tire condition.

At subsequent S160, a tire ID is read out from the tire data received this time and is stored as a received ID in the memory (backup RAM, EEPROM, etc.) being related to the receiver ID for monitoring the tire condition stored as selected ID at S150. The receiver 30 mounted on the vehicle is capable of obtaining tire data from a plurality of detectors 10 and transmits all tire data that are obtained in response to the request signal. Therefore, by storing the receiver ID of the receiver 30 that has transmitted the tire data in relation to the tire ID included in the tire data that is received, it is allowed to identify a tire data that can be received by the receiver 30 specified by the receiver ID.

When the processing is executed at S160 or when it is determined at S140 that the preset period of time has elapsed, it is determined at S170 if the request signal has been transmitted for all of the receiver IDs stored in the ROM. If the request signal has not been transmitted for all of the receiver IDs stored in the ROM, the routine returns again to S110 where receiver IDs for which the request signal has not been transmitted are read out from the ROM, and processing at S120 and at subsequent steps are executed by the same procedure as the one described above.

If it is determined at S170 that the request signal has been transmitted to all of the receiver IDS stored in the ROM, then, the number of the tires possessed by the vehicle, the number of the tires the tire data of which can be received by the receivers 30 and arrangement of the tires of the vehicle (or kind of the vehicle) are recognized based upon the receiver IDS stored in the memory (backup RAM, EEPROM, etc.) for monitoring the tire conditions and upon the tire IDs that are stored being related to the receiver IDs. These data are stored in the memory (backup RAM, EEPEOM, etc.) as vehicle data used for monitoring the tire conditions to end the processing.

Next, FIG. 4 is a flowchart illustrating processing for monitoring the tire conditions, which is repetitively executed by the monitoring ECU 52 while the ignition switch of the vehicle is held turned on.

In the processing for monitoring the tire conditions, first, only one receiver ID is selected or read out of the receiver IDs stored in the memory (backup RAM, EEPROM, etc.) for monitoring the tire conditions at S210. Then, a request signal including the receiver ID is output onto the single communication line 50 at S220.

At subsequent S230, it is determined whether the tire data is received through the single communication line 50. If the tire data is not received, the routine proceeds to S240 where it is determined whether a preset period of time that has been set in advance for obtaining the tire data has elapsed. If the preset period of time has not been elapsed, the routine returns to S230 to wait for the transmission of tire data from the receiver 30 to which is imparted the receiver ID that is transmitted this time for the preset period of time.

When it is determined at S240 that the preset period of time has elapsed, it is determined that any abnormal condition has occurred on the single communication line 50 or on the receiver 30. The routine then proceeds to S270 to inform the meter ECU 54 of the content of abnormal condition that is determined. The meter ECU 54 works to flash an alarm light for informing the abnormal condition of the monitoring system.

On the other hand, when it is determined at S230 that the tire data is received, the routine proceeds to subsequent S250 where the pneumatic pressure data, temperature data and tire ID are obtained from the tire data that are received. It is determined at S260 whether the obtained data are normal.

When abnormal condition is determined at S260 from the obtained data, such as a drop in the tire pneumatic pressure, a rise in the tire temperature, etc., the routine proceeds to S270 where an abnormal tire is specified from the tire ID and is stored in the memory (backup RAM, EEPROM, etc.). The meter ECU 54 is informed of this fact and works to flash the alarm light to inform any abnormal condition related to the tire pneumatic pressure or the temperature.

At S260, it is determined, from the number of the tire IDs that are obtained, whether the tire data that can be obtained are all obtained through the receiver 30 to which the request signal is transmitted this time. When the tire data that can be obtained through the receiver 30 are not all obtained, it is so regarded that the detector 10 of the tire 4 is abnormal transmitting the tire data that were not obtained, and the routine proceeds to S270.

In this case, S270 specifies the abnormal tire from the tire ID that was not obtained this time, stores the abnormal detector 10 in the memory (backup RAM, EEPROM, etc.) and informs the meter ECU 54 of this fact so as to flash the alarm light for informing abnormal detector 10.

When it is determined at S260 that the obtained data are normal, the processing once ends, and processing after S210 are executed again.

At S210, the receiver IDs for monitoring read out from the memory (backup RAM, EEPROM, etc.) are successively changed for every execution of the processing. The monitoring ECU 52, therefore, repetitively executes the processing for monitoring the tire conditions to successively obtain tire data from all of the receivers 30 mounted on the vehicle, and determines abnormal condition in the tire from the tire data that are obtained.

According to the monitoring system of this embodiment, a plurality of receivers 30 and the monitoring ECU 30 are connected together through the single communication line 50, and receiver IDs are automatically imparted to the receivers 30 from the vehicle-side through the connectors 40 of the vehicle-side which are for connecting the receivers 30 to the single communication line 50. The monitoring system of this embodiment, therefore, can be build up even for the vehicles having the numbers of the tires and arrangements thereof different from those of FIG. 1A, by using the receivers 30 having the same specifications and the same operating conditions.

The monitoring ECU 52 obtains the tire data from the receivers 30 every time when the request signal is transmitted to the receivers 30 through the single communication line 50, while the receiver IDs for the receivers 30 necessary for calling the receivers 30 are automatically set through the above processing for obtaining the vehicle data. According to the monitoring system of this embodiment, therefore, the monitoring ECU 52, too, can be used in common even for the vehicles having different numbers of tires and different arrangements of tires. Accordingly, the monitoring system is built up even for the vehicles of different kinds by using the same parts (receivers 30, monitoring ECU 52).

It should be noted the above embodiment may be modified in a variety of ways.

For example, in place of obtaining tire data from the receivers 30 by polling, the monitoring ECU 52 may allocate the time for the receivers 30 to transmit the tire data, and the time data may be registered as schedule data to the receivers 30, so that the receivers 30 transmit the tire data at different timings in accordance with the registered schedule data. The detector 10 may be the one which detects only the pneumatic pressure in the tire.

What is claimed is:

1. A monitoring system for monitoring tire pneumatic pressures, comprising:
    a plurality of detector means incorporated in a plurality of tires of a vehicle to detect pneumatic pressures in the tires and to transmit tire data including tire identification data identifying a particular tire and detected pressure corresponding to the particular tire;
    a plurality of receiver means for receiving signals transmitted from the detector means to obtain the tire data from the tires;
    monitoring means for monitoring the pneumatic pressures in the tires based on the tire data obtained by the receiver means;
    a single communication line connecting the plurality of receiver means and the monitoring means so that the monitoring means obtains the tire data of the tires by executing communication with the receiver means through the single communication line; and
    an identification data imparting means provided at places where the receiver means are installed on the vehicle so that a particular receiver means is associated, from a vehicle-side, with a receiver identification data identifying the particular receiver means for the communication with the monitoring means.

2. A monitoring system for monitoring tire pneumatic pressures, comprising:
    a plurality of detector means incorporated in a plurality of tires of a vehicle to detect pneumatic pressures in the tires and to transmit tire data obtained by imparting identification data of the tires to detected pressures;
    a plurality of receiver means for receiving signals transmitted from the detector means to obtain the tire data from the tires;

monitoring means for monitoring the pneumatic pressures in the tires based on the tire data obtained by the receiving means;

a single communication line connecting the plurality of receiver means and the monitoring means so that the monitoring means obtains the tire data of the tires by executing communication with the receiver means through the single communication line;

an identification data imparting means provided at places where the receiver means are installed on the vehicle so that the receiver means are imparted, from a vehicle-side, with the identification data for communication necessary for the communication with the monitoring means; and electric connectors that connect the single communication line to the receiver means, wherein the identification data imparting means are incorporated in the connectors, and wherein the receiver means are imparted with the identification data for communication when the receiver means are installed on the vehicle and are connected to the connectors for the first time.

3. The monitoring system according to claim 1, wherein:
the particular receiver means transmits the tire data obtained from the detector means to the single communication line when a request signal including the receiver identification data for communication is received through the single communication line; and
the monitoring means successively outputs the request signals including the receiver identification data for communication of the receiver means to the single communication line thereby to obtain the tire data from the receiver means through the single communication line.

4. The monitoring system according to claim 3, wherein the monitoring means is programmed to, prior to starting the operation for monitoring the pneumatic pressures:
successively select the receiver identification data for communication out of a plurality of receiver identification data for communication that are registered in advance;
successively output the request signal including the selected receiver identification data for communication onto the single communication line;
determine that the receiver means is the one mounted on the vehicle when the receiver means transmits the tire data in response to the request signal that is output;
store the receiver identification data for communication included in the request signal that is output as identification data for monitoring; and
obtain the tire data from the receiver means based on the receiver identification data for communication stored as the data for monitoring, when the pneumatic pressures are to be monitored.

5. The monitoring system according to claim 2, wherein:
each connector has a plurality of terminals; and
the identification code is defined with a combination of grounding and non-grounding of the plurality of terminals.

6. The monitoring system according to claim 1, wherein the detector means further detects temperature in the tire, and the tire data further includes temperature data representative of the temperature in the tire.

7. The monitoring system according to claim 1, wherein at least one of the receiver means receives signals from at least two of the detector means.

8. The monitoring system according to claim 1, wherein the detector means includes a pressure sensor to detect the pneumatic pressures, a processor configured to facilitate detecting signals from the pressure sensor and inserting the tire identification data and pneumatic pressure in the tire data, and a transmitter responsive to the processor to transmit the tire data.

9. The monitoring system according to claim 1, wherein the receiver means transmits the tire data and the receiver identification data responsive to receipt of a request having the receiver identification data.

10. The monitoring system according to claim 1, wherein the receiver means transmits the tire data and the receiver identification data responsive to a schedule.

11. The monitoring system according to claim 1, wherein the receiver means includes a receiver to receive the tire data and a processor configured to facilitate communicating the tire data and the associated receiver identification data on the single communication line.

12. A monitoring system for monitoring tire pneumatic pressures, comprising:
a plurality of detectors incorporated in a plurality of tires of a vehicle, the detectors being configured to facilitate detecting pneumatic pressures in the tires and to transmit tire data including tire identification data identifying a particular tire and detected pressure corresponding to the particular tire;
a plurality of receivers configured to facilitate receiving signals transmitted from the detectors to obtain the tire data from the tires;
a monitor unit configured to facilitate monitoring the pneumatic pressures in the tires based on the tire data obtained by the receivers;
a single communication line connecting the plurality of receivers to the monitoring unit so that the monitor unit obtains the tire data of the tires by executing communication with the receivers through the single communication line; and
a plurality of connectors for connecting the single communication line to the receivers respectively, the connectors being configured to impart receiver identification data different from each other to the receivers, respectively.

13. The monitoring system according to claim 12, wherein:
each of the connectors has a plurality of terminals; and
each of the identification data is defined by grounding and non-grounding of the terminals.

14. The monitoring system according to claim 12, wherein:
the particular receiver transmits the tire data obtained from the detector to the single communication line when a request signal including the receiver identification data for communication is received through the single communication line; and
the monitoring unit successively outputs the request signals including the receiver identification data for communication of the receivers to the single communication line thereby to obtain the tire data from the receivers through the single communication line.

15. The monitoring system according to claim 14, wherein the monitoring unit is programmed to, prior to starting the operation for monitoring the pneumatic pressures:

successively select the receiver identification data for communication out of a plurality of receiver identification data for communication that are registered in advance;

successively output the request signal including the selected receiver identification data for communication onto the single communication line;

determine that the receiver is the one mounted on the vehicle when the receiver transmits the tire data in response to the request signal that is output;

store the receiver identification data for communication included in the request signal that is output as identification data for monitoring; and obtain the tire data from the receiver based on the receiver identification data for communication stored as the data for monitoring, when the pneumatic pressures are to be monitored.

16. The monitoring system according to claim 12, wherein at least one of the receivers receives signals from at least two of the detectors.

17. The monitoring system according to claim 12, wherein the detector includes a pressure sensor to detect the pneumatic pressures, a processor configured to facilitate detecting signals from the pressure sensor and inserting the tire identification data and pneumatic pressure in the tire data, and a transmitter responsive to the processor to transmit the tire data.

18. The monitoring system according to claim 12, wherein the receiver transmits the tire data and the receiver identification data responsive to receipt of a request having the receiver identification data.

19. The monitoring system according to claim 12, wherein the receiver transmits the tire data and the receiver identification data responsive to a schedule.

* * * * *